(12) United States Patent
Frotz et al.

(10) Patent No.: US 11,904,750 B2
(45) Date of Patent: Feb. 20, 2024

(54) STRUCTURAL COMPONENT, SEAT COMPONENT AND SEAT

(71) Applicant: Adient Engineering and IP GmbH, Burscheid (DE)

(72) Inventors: Thomas Frotz, Wermelskirchen (DE); Sven Oldach, Remscheid (DE); Daniel Bahr, Kürten (DE); Rudolf Wilhelm Hemmelrath, Leverkusen (DE); Ben Schrieber, Cologne (DE)

(73) Assignee: Adient US LLC, Plymouth, MI (US)

( * ) Notice: Subject to any disclaimer, the term of this patent is extended or adjusted under 35 U.S.C. 154(b) by 96 days.

(21) Appl. No.: 17/600,622

(22) PCT Filed: Apr. 1, 2020

(86) PCT No.: PCT/EP2020/059293
§ 371 (c)(1),
(2) Date: Oct. 1, 2021

(87) PCT Pub. No.: WO2020/201375
PCT Pub. Date: Oct. 8, 2020

(65) Prior Publication Data
US 2022/0250520 A1    Aug. 11, 2022

(30) Foreign Application Priority Data

Apr. 1, 2019    (DE) ..................... 10 2019 204 611.8

(51) Int. Cl.
*B60N 2/90*    (2018.01)
*B60N 2/64*    (2006.01)
(Continued)

(52) U.S. Cl.
CPC ............... *B60N 2/914* (2018.02); *B60N 2/34* (2013.01); *B60N 2/643* (2013.01); *B60N 2/646* (2013.01); *B60N 2/686* (2013.01); *B60N 2/02253* (2023.08)

(58) Field of Classification Search
CPC ........ B60N 2/914; B60N 2/643; B60N 2/665; B60N 2/99
See application file for complete search history.

(56) References Cited

U.S. PATENT DOCUMENTS

2003/0230917 A1* 12/2003 Dorfler .................. B60N 2/914
297/284.1
2006/0033369 A1* 2/2006 Eysing .................. A47C 7/467
297/284.4
(Continued)

FOREIGN PATENT DOCUMENTS

CN      105882461 A     8/2016
DE      10351157 B3     6/2005
(Continued)

OTHER PUBLICATIONS

China National Intellectual Property Administration, Office Action in Application No. 202080025504.2 dated Dec. 28, 2022, 12 pages.
(Continued)

*Primary Examiner* — Timothy J Brindley
(74) *Attorney, Agent, or Firm* — Marshall & Melhorn, LLC (57) ABSTRACT

A structural component may have a carrier structure and a substructure arranged on the carrier structure and having a variable contour. The substructure may have an adjustment mechanism with a plurality of adjustment elements. The adjustment mechanism may be configured to adjust the adjustment elements between a compressed position and an expanded position in order to vary the contour.

13 Claims, 10 Drawing Sheets

(51) Int. Cl.
  *B60N 2/34* (2006.01)
  *B60N 2/68* (2006.01)
  *B60N 2/02* (2006.01)

(56) References Cited

U.S. PATENT DOCUMENTS

| | | | | |
|---|---|---|---|---|
| 2011/0266849 | A1* | 11/2011 | Schwarze | B60N 2/62 |
| | | | | 74/89.23 |
| 2012/0119551 | A1 | 5/2012 | Brncick et al. | |
| 2016/0339810 | A1* | 11/2016 | Pluta | B60N 2/01 |
| 2018/0079333 | A1* | 3/2018 | Ma | B60N 2/3065 |
| 2018/0134191 | A1* | 5/2018 | Ketels | B60N 2/503 |
| 2018/0186263 | A1 | 7/2018 | Dry | |
| 2021/0129718 | A1* | 5/2021 | Hunsaker | B60N 2/26 |

FOREIGN PATENT DOCUMENTS

| | | | | |
|---|---|---|---|---|
| DE | 102005028351 B4 | | 8/2007 | |
| DE | 102008020504 A1 | * | 11/2009 | B60N 2/449 |
| DE | 102016102512 A1 | | 8/2016 | |
| DE | 102018104584 A1 | | 9/2018 | |
| DE | 102020134186 B3 | * | 3/2022 | B60N 2/2222 |
| DE | 102021002469 A1 | * | 11/2022 | |
| DE | 102021115767 A1 | * | 12/2022 | |
| WO | WO-2020201384 A1 | * | 10/2020 | B60N 2/34 |

OTHER PUBLICATIONS

European Patent Office, International Search Report with Written Opinion in Application No. PCT/EP2020/059293, dated Jul. 20, 2020, 10 pages, Rijswijk, Netherlands.

\* cited by examiner

STRUCTURAL COMPONENT, SEAT COMPONENT AND SEAT

FIELD

The invention relates to a structural component for a seat, in particular a vehicle seat. Furthermore, the invention relates to a seat component and to a seat, in particular a vehicle seat.

Structural components for a seat are well known. Structural components of this type usually comprise a fiber reinforced thermoplastic with integrated fiber reinforcements. In order to adjust the seat into different positions, such as a seating comfort position, a bed position or a folded position, the seat is formed in multiple pieces, for example from a backrest, a seat part and a base part, which are connected to one another rotatably by rotational or latching fittings.

BACKGROUND

It is an object of the invention to specify a structural component which can be adjusted simply into one of a plurality of positions and in the process compensates for and absorbs loads and forces which occur. Moreover, it is an object of the invention to specify an improved seat component, in the case of which different support variants can be set simply, and a vehicle seat with an improved seat component of this type.

With regard to the structural component, the object is achieved by the features of the claims. With regard to the seat component, the object is achieved by the features of the claims. With regard to the seat, the object is achieved by the features of the claims.

Developments of the invention are the subject matter of the dependent patent claims.

SUMMARY

According to the invention, the object is achieved by a structural component, in particular a kinetic structural component, which comprises a part structure with a variable contour, the part structure having, in order to change the contour, an adjusting or folding mechanism, in particular an adjustable or foldable slat or wing mechanism.

According to the invention, furthermore, the object can be achieved by a structural component, in particular a kinetic structural component, which comprises at least one supporting structure and one part structure which is arranged on the supporting structure and has a variable outer contour, the part structure having an adjusting mechanism with a plurality of adjusting elements, and the adjusting mechanism being set up to adjust the adjusting elements between a compressed position and an expanded position, in particular from the compressed position into the expanded position or into an intermediate position or vice versa, in order to change or to deform the outer contour.

In one possible embodiment, the adjusting mechanism is coupled in terms of movement to the supporting structure, in order, in the case of a movement of the supporting structure, to adjust the adjusting elements between the compressed position and the expanded position, in particular to adjust them from the compressed position into the expanded position or vice versa, and to adapt the outer contour, in particular to adjust it or to change it. An adaptation of the structural component by way of adjustment of the adjusting elements enables, in a simple way, an outer contour which is deformed or changes during a movement of the supporting structure.

A further embodiment provides that a drive element can be provided which is coupled in terms of movement to the adjusting mechanism, in order to adjust the adjusting elements between the compressed position and the expanded position and to change the outer contour. Here, the adjusting elements can be adjusted only by way of the movement of the supporting structure or only by way of the drive element. As an alternative, the adjusting elements can be adjusted by way of both the drive element and the movement of the supporting structure.

The drive element can be, for example, an electric actuating element, a hydraulic actuating element or a pneumatic actuating element. In particular, an actuating motor is provided as an electric actuating element. For example, a fillable fluid balloon or fluid cushion, in particular an air pillow or air cushion, is provided as a hydraulic or pneumatic actuating element.

In one possible embodiment, the adjusting mechanism can be configured as an adjustable folding mechanism. For example, the adjusting mechanism can be configured as an adjustable or foldable slat or wing mechanism. Here, the respective adjusting element can be configured as a slat, a wing and/or a fluid cushion or fluid balloon.

For example, an adjusting or folding mechanism of this type, in particular an adjustable slat or wing mechanism, is set up to adjust adjusting elements, such as, for example, slats, wings and/or air cushions which are arranged in between, in order to set a contour, in particular a supportive or ergonomically shaped contour. Here, forces which act on the part structure, such as, for example, controlled compressive forces or shear forces, can be absorbed and forwarded, in order to change, in particular to move in a curved or arcuate manner, the shape, volume, dimensions and/or position of the part structure during an expansion or compression of the adjusting or folding mechanism. For example, an adjusting element or adjusting elements, such as, for example, slats, wings and/or air cushions, is/are moved during the expansion, in particular is/are deployed, unfolded or inflated, in such a way that the part structure is given a corresponding outer contour, in particular an arcuate or curved outer contour. During the compression, the part structure or part structures is/are moved back, in particular folded up or folded together.

A further aspect provides that the respective adjusting element is moved during the expansion, in particular is deployed, unfolded or inflated, and/or is designed, in such a way that the part structure is given an arcuate or curved outer contour in the expanded position.

The respective adjusting element can also be moved, in particular can be moved back, during the compression, for example can be folded up or folded together, in such a way that the part structure has a smaller height in the compressed position than in the expanded position, and/or has a planar outer contour.

A further embodiment provides that the part structure is formed from at least one panel element with a plurality of repeating adjusting elements, in particular with a plurality of mechanical expansion elements, for example slats, webs, ribs, which are arranged in one row. Here, the adjusting elements of one row can have identical shapes, dimensions and/or sizes. As an alternative, the adjusting elements in one row can vary in terms of their shapes, dimensions and/or sizes. For example, the height, length and/or width of the adjusting elements in one row can vary. For instance, the height of the adjusting elements of one row can, for example, rise and fall again, with the result that, for example, a curved or arcuate outer contour is formed in a stretched position or in the expanded position.

The panel element is configured, for example, as a monolithic component, in particular an injection molded part, in particular a plastic part, into which slots and slats are formed in an alternating manner in one row. The panel element has a frame with rows of formed slats. The material of the panel element is permanently elastic, with the result that the slats are formed in an articulated manner.

A further embodiment provides that the panel element is formed from multiple rows of adjusting elements, in particular from individual rows of adjusting elements which are arranged above one another and/or next to one another. This makes a configuration of bolster or curved contours as an outer contour possible.

A further aspect provides that the part structure is coupled in terms of movement to the supporting structure and/or at least one panel element in such a way that the part structure changes its outer contour and/or its volume in a manner which is dependent on a controlled force which acts on the at least one panel element and/or on the supporting structure. For example, the adjusting elements of one or more rows are moved, in particular expanded, synchronously or at the same time. In particular, the adjusting elements are stretched or unfolded, or are conversely compressed, in particular closed, pulled together or folded up.

The seat component according to the invention, in particular of a backrest or of a seat part of a seat, such as a vehicle or aircraft seat, comprises at least one seat carrier, one upholstery part and/or one cover, and one structural component, as has been described in greater detail above. Here, the seat carrier can form the supporting structure of the structural component. As an alternative, the structural component can be arranged on the seat carrier.

One development of the seat component provides that the part structure forms at least one part region of the upholstery part and/or the cover. The cover can be configured as an upholstered cover. In this embodiment, the structural component is integrated, for example, into a corresponding upholstery layer of the upholstered cover. In particular, the structural component is arranged between the supporting structure and the upholstery part and/or the cover. The structural component can also be integrated as a supporting element into the upholstery part and/or the cover.

The seat according to the invention comprises at least two seat components which can be moved with respect to one another and of which at least one movable seat component comprises the above-described structure component, it being possible for the flexible structure to be moved into an expanded position or into a compressed position in the case of a movement of the movable seat component relative to the other seat component.

The invention makes a contour adaptation and therefore comfort adaptation of an upholstery part possible, which upholstery part is supported by way of a movable structural component of this type. Here, the contour adaptation of the upholstery part takes place by way of a deforming contour of the part structure below the foam of the upholstery part, for example, by electrically driven adjusting elements, such as wings, slats, webs and/or pump-driven air cushions.

In a further embodiment, the contour adaptation or deformation of the upholstery part takes place by an electric drive which correspondingly actuates the adjusting or folding mechanism, in particular its adjusting elements, such as wings, slats, etc. In addition or as an alternative, the adjusting or folding mechanism can be coupled in terms of movement to an adjustment of the seat, in particular to an adjusting mechanism of the backrest for the adjustment of the latter relative to the seat part or seat cushion. As an alternative, in addition to the movement coupling to a seat adjusting mechanism, an additional drive element can be provided.

The movement-coupled adaptation of the upholstery part by a deforming contour during a backrest movement relative to the seat part or seat cushion can take place in the case of one refinement of the adjusting or folding mechanism by way of deployable slats or wings with an adjusting principle which is similar to a pop-up action.

Here, the contour adjustment or adaptation can take place firstly only in the backrest and optionally by way of its adjusting movement, and/or secondly at the same time in the seat part and optionally by way of its adjusting movement. For this purpose, one or more panel elements which lie above one another, in particular plates, such as, for example, plastic plates, are provided with slots and inflection points in a defined pattern. The pattern consisting of slots and inflection points forms adjustable slats or wings between the slots, an adjustment of said slats or wings making a three-dimensional deformation of the original panel element or elements possible.

In other words: the panel elements, such as flat plates, which are individual or lie above one another comprise pop-up slats or pop-up wings which make a contour adjustment possible by way of correspondingly controlled adjustment. Here, this can take place in a plurality of adjusting stages or adjusting groups within one pattern. Here, a plurality of adjusting elements can be arranged in planes of different height and/or offset with respect to one another, and can additionally be connected in each case to one another by a lever. The static requirement of the surface can be adapted individually by the number of levers and their geometry. This principle makes it possible to deform a flat plate into a three-dimensional panel, and vice versa. A contour of this type, which can be set and therefore deforms, of a structural component below an upholstery part, in particular a foam upholstery part, can be used, in particular, for the backrest and/or the seat part of a seat. A structural component of this type can also be used, however, in a headrest, an armrest and other comfort-relevant vehicle or aircraft components. Depending on the configuration of the structural component and, in particular, of the adjusting mechanism of the part structure, it can have functions which relate to comfort and are relevant to safety. The use of a structural component of this type with an adjustable part structure in a second or third seat row ("open seating") is also conceivable, in order to achieve a flat load area, without influencing the comfort of the seat. The plastic plates are preferably manufactured from polypropylene. The plastic plates can be produced in a customary method, such as an injection molding, punching or stamping method, or else by way of CNC milling or using the 3D printing method.

DESCRIPTION OF THE FIGURES

Exemplary embodiments of the invention will be described in greater detail on the basis of the drawings, in which.

Parts which correspond to one another are provided with the same designations in all the figures.

DETAILED DESCRIPTION

FIGS. 1 to 6 diagrammatically show different illustrations of a seat S with a structural component 1, in particular a kinetic structural component 1. As seat components, the seat S comprises at least one backrest 2 and one seat part 3 and one head support 4. A footrest (not shown in greater detail) can optionally be provided. The seat components can be moved relative to one another, in particular. For example, the backrest 2 is arranged such that it can be pivoted relative to the seat part 3. The head support 4 can be arranged fixedly on the backrest 2. As an alternative, the head support 4 can also be arranged on the backrest 2 such that it can be pivoted and/or moved vertically relative to said backrest 2.

The seat S is shown diagrammatically and comprises a supporting structure T both for the backrest 2 and for the seat part 3 and the head support 4. Here, the supporting structure T can be configured in one piece or in multiple pieces. For instance, each seat component can have an associated supporting structure part, it being possible for the supporting structure parts to be arranged such that they can be moved relative to one another. In addition, the seat S comprises an upholstery part 5 which is attached to and held on the supporting structure T.

The structural component 1 can be part of the supporting structure T or the upholstery part 5. In particular, the supporting structure T of the respective seat component can at the same time form the supporting structure T of the structural component 1.

As an alternative or in addition, the structural component 1 can be integrated into the upholstery part 5. In a further embodiment, the structural component 1 can be arranged and fastened between the upholstery part 5 and the supporting structure T.

The structural component 1 comprises a part structure 1.1 with an adjusting mechanism 1.2 for setting a contour K, in particular an outer contour (indicated by dashed line in FIG. 1) on the upholstery part 5 in the assembled state (not shown).

Figure 1:
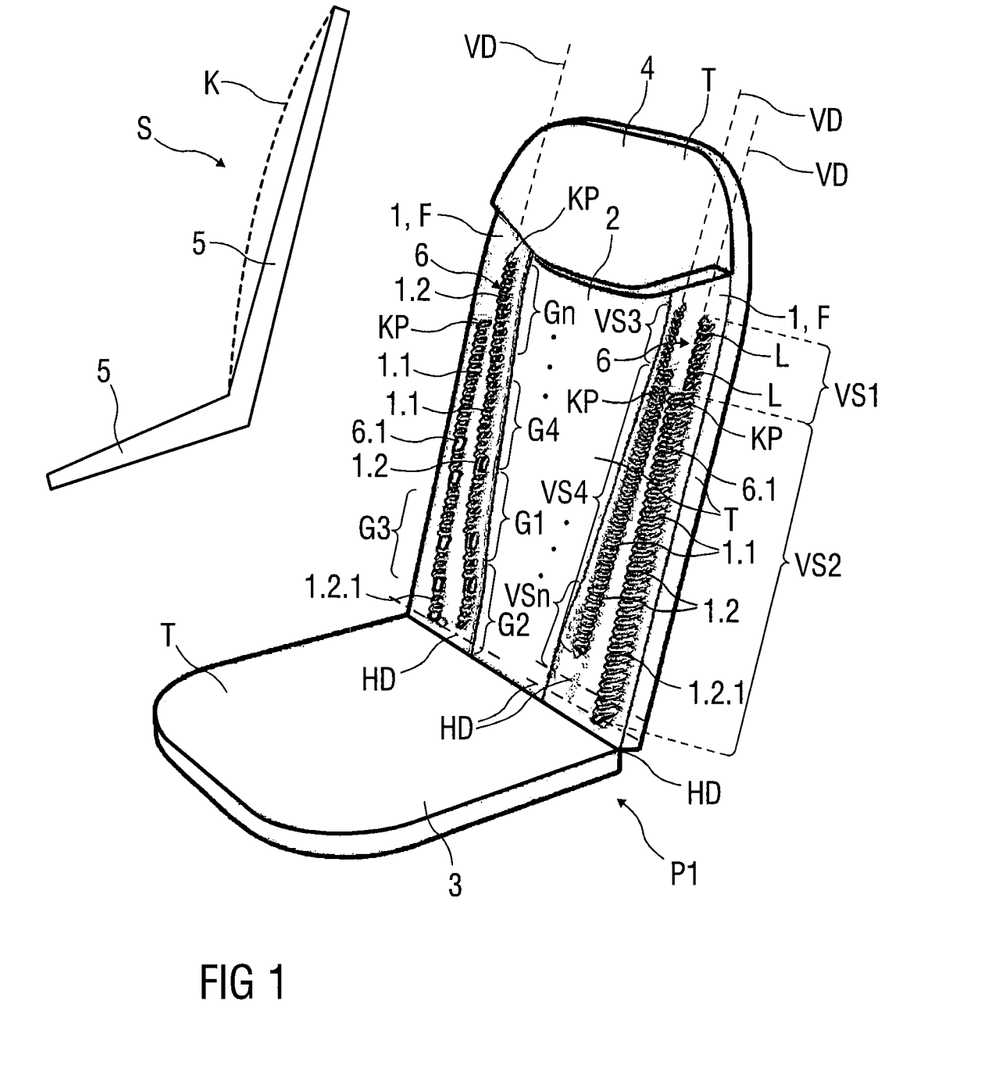
FIGS. 1 to 6 diagrammatically show different illustrations of a seat with a structural component with an adjusting mechanism for setting a contour, and FIGS. 7 to 15 diagrammatically show different illustrations of a structural component with an adjusting mechanism for setting a contour.

In order to change the contour K, the adjusting mechanism 1.2 is configured, in particular, as a folding mechanism. To this end, the adjusting mechanism 1.2 comprises a plurality of adjustable or foldable adjusting elements 1.2.1, such as, for example, slats or wings.

Here, the adjusting elements 1.2.1 can be coupled in groups G1 to Gn, the adjusting elements 1.2.1 of one of the groups G1 to Gn being adjusted synchronously. As an alternative or in addition, the groups G1 to Gn can be adjusted independently or dependently of one another in a synchronous or non-synchronous manner, for example sequentially, in order to adjust their adjusting elements 1.2.1 correspondingly. As a result, the contour K can be changed and set in regions correspondingly.

In particular, the adjusting mechanism 1.2 is set up to adjust the adjusting elements 1.2.1 in groups and/or individually in such a way that a desired contour K, for example a more supportive contour K in safety-relevant states or a comfortable, in particular ergonomically shaped contour K is set. Here, the shape, volume, dimensions and/or position of the part structure 1.1 and therefore the contour K of the upholstery part 5 can be changed or set correspondingly during an expansion or compression of the adjusting elements 1.2.1, in particular can be folded or deployed partially or completely linearly and/or can be moved in a curved or arcuate manner.

The adjusting elements 1.2.1 are configured, for example, in the form of adjustable slats L.

The part structure 1.1 is configured, for example, as a panel element F, in particular a plate. A pattern 6 consisting of slots 6.1 and inflection points KP is made in the flat part structure 1.1. The slots 6.1 run horizontally in the plate-shaped part structure 1.1. In the region of the inflection points KP, the adjusting elements 1.2.1 can be tilted, in particular folded or rotated, about a horizontal rotational axis HD and/or a vertical rotational axis VD.

An adjustable adjusting element 1.2.1, in particular an adjustable slat L or a wing, is arranged between two slots 6.1, an adjustment of said adjusting elements 1.2.1 making a three-dimensional deformation of the original panel element/elements F and therefore of the part structure 1.1 and an upholstery part 5 which is arranged on the latter possible.

Figure 2:
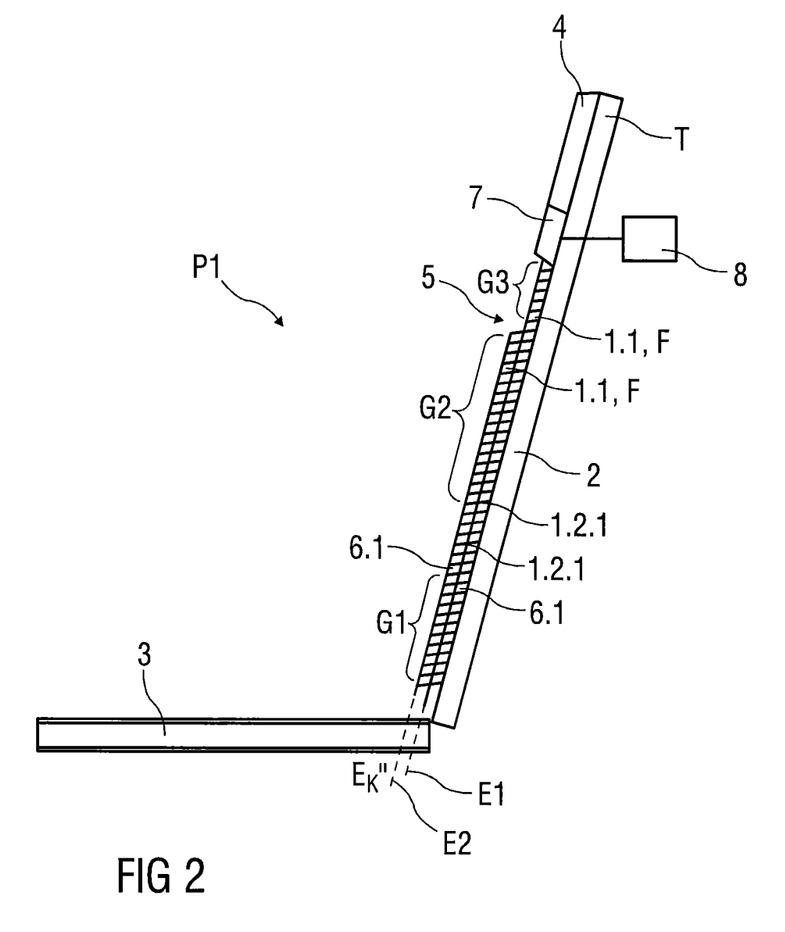

FIG. 2 shows a further embodiment for a seat S with a part structure 1.1. Here, two part structures 1.1, in particular two panel elements F or flat plates, are arranged so as to lie above one another, and are fastened on the supporting structure T.

The plate-shaped part structures 1.1 comprise adjusting elements 1.2.1 in the manner of what are known as pop-up slats or pop-up wings which make a change of the contour K by way of a correspondingly controlled adjustment possible.

In one possible embodiment, the adjusting mechanism 1.2 is coupled in terms of movement to the supporting structure T, in order, in the case of a movement of the supporting structure T, to adjust the adjusting elements 1.2.1 between a compressed position and an expanded position and to change the contour K.

FIG. 2 shows an expanded position of the adjusting elements 1.2.1, in particular a deployed position.

FIG. 1 shows groups G1 to Gn of adjusting elements 1.2.1 or individual adjusting elements 1.2.1 which are shown both in a completely expanded position, a partially expanded position and in a partially compressed position and completely compressed position.

As an alternative or in addition to the coupling in terms of movement of the adjusting mechanism 1.2 to the supporting structure T, the seat S can comprise a corresponding control unit 7, in particular a drive member or control member (shown in FIG. 2). The control unit 7 is coupled in terms of movement to the adjusting mechanism 1.2. To this end, the control unit 7 is driven, in particular, by a drive element 8, for example an electric drive element or actuating element, a hydraulic drive element or actuating element or a pneumatic drive element or actuating element (not shown in greater detail), in order to adjust the adjusting mechanism 1.2 correspondingly.

Here, the control unit 7 can control the drive element 8 in such a way that the adjusting elements 1.2.1 are activated, deactivated or actuated in groups or individually in a plurality of adjusting stages VS1 to VSn (as shown by way of example in FIGS. 1 to 3) or groups G1 to Gn (as shown by way of example in FIGS. 1 and 2), such as adjusting groups, within a pattern 6. Here, a plurality of adjusting elements 1.2.1 can be arranged in planes E1 to Ek of different height and/or offset with respect to one another, and can additionally be connected to one another in each case by a lever.

The static requirement of the surface can be adapted individually by the number of levers and their geometry, in particular the dimensions, shape, material and/or size. Using this principle, it is possible to deform a flat plate into a three-dimensional surface and vice versa. A contour K of this type, which is adjustable and therefore deforms, of the structural component 1 below the upholstery part 5 can be used, in particular, for a seat component, such as the backrest 2 and/or the seat part 3.

A structural component 1 of this type can also be used, however, in a head support 4, an armrest and other comfort-relevant vehicle or aircraft components (not shown in greater detail). Depending on the configuration of the structural component 1 and, in particular, of the adjusting mechanism 1.2 of the part structure 1.1, it can have functions which relate to comfort and are relevant to safety. The use of a structural component 1 of this type with an adjustable part structure 1.1 in a second or third seat row ("open seating") is also conceivable, in order to achieve a flat load area, without influencing the comfort of the seat S. The plate-shaped part structures 1.1, in particular plastic plates, are preferably manufactured from polypropylene. The plastic plates can be produced in a customary method, such as an injection molding, punching or stamping method, or else by way of CNC milling or using the 3D printing method. The structural component 1 is, in particular, a monolithic plastic component. The supporting structure T and the structural component 1 can also be configured as a single monolithic plastic component.

The invention makes a contour adaptation and therefore comfort adaptation of an upholstery part 5 possible, which upholstery part 5 is supported by a movable structural component 1 of this type, in particular by its adjustable part structure 1.1. Here, the contour adaptation of the upholstery part 5 takes place by a deforming contour K of the part structure 1.1 below the foam of the upholstery part 5, for example by electrically, hydraulically or pneumatically driven adjusting elements 1.2.1, such as wings, slats L, webs and/or pump-driven fluid elements, such as air cushions. In addition, as described multiple times, airbags or air cushions which assist the lifting of the adjusting elements 1.2.1 can be arranged in the slots 6.1.

In a further embodiment, the contour adaptation or contour deformation of the upholstery part 5 takes place by the, for example, electric drive 8 which actuates the adjusting mechanism 1.2 correspondingly, in particular its adjusting elements 1.2.1. In addition or as an alternative, the adjusting mechanism 1.2 can be coupled in terms of movement to an adjustment of the seat S, in particular to a tilt mechanism (not shown) of the backrest 2 for the adjustment of the latter relative to the seat part or seat cushion. As an alternative, in addition to the coupling in movement terms to a seat adjusting mechanism, an additional drive element can be provided.

The movement-coupled adaptation of the upholstery part 5 by a contour K which deforms during a movement of the backrest 2 relative to the seat part 3 or seat cushion can take place, in the case of one refinement of the adjusting mechanism 1.2 with slats L or wings which can be deployed synchronously by the backrest movement, using an adjusting principle which is similar to a pop-up action.

Here, the contour adjustment or contour adaptation can take place firstly only in the backrest 2 and optionally by way of its adjusting movement, and/or secondly at the same time in the seat part 3 and optionally by way of its adjusting movement. For this purpose, one or more panel elements F which lie above one another, in particular plates, such as, for example, plastic plates, are provided with slots 6.1 and inflection points KP in a defined pattern 6.

Figure 3:
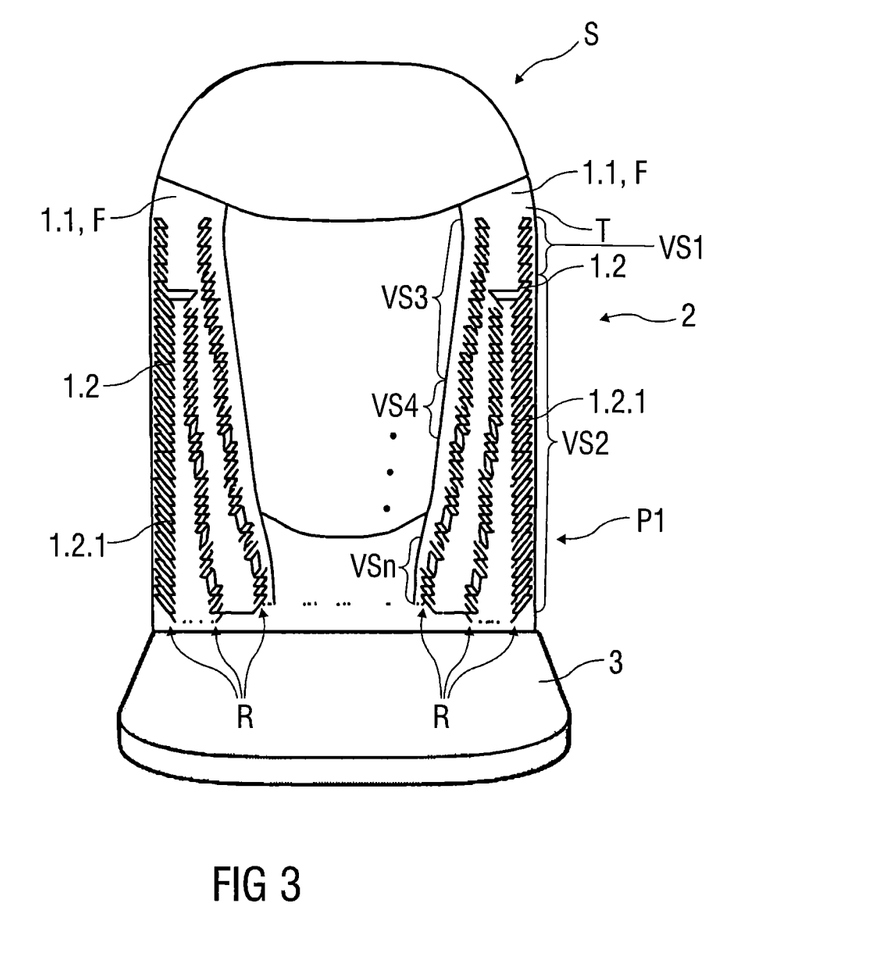

FIG. 3 shows the seat S from the front with two laterally arranged part structures 1.1, the seat S being set in the seat position P1.

In this exemplary embodiment, the part structure 1.1 is formed from two panel elements F with a plurality of repeating adjusting elements 1.2.1 which are arranged in a plurality of rows R. Here, the respective part structure 1.1 forms a side bolster of the backrest 2. In the exemplary embodiment, each part structure 1.1 comprises three rows R which are arranged next to one another in the transverse extent of the backrest 2. Here, the rows R of repeating adjusting elements 1.2.1 run in the longitudinal direction of the backrest 2. The respective row R can run in a straight or oblique manner or in curves or in an arc. The rows R can have different lengths and/or a different number of adjusting elements 1.2.1.

The two part structures 1.1 are coupled in terms of movement to the supporting structure T of the backrest 2 in such a way that the two part structures 1.1 change their contour K, in particular their volume, in a manner which is dependent on a controlled force which acts on the supporting structure T. In particular, in the case of a movement of the backrest 2 into a largely perpendicular or slightly tilted position, for example a comfortable seating position, the adjusting elements 1.2.1 are deployed and are moved into the expanded position, such that a resulting contour K of the respective part structure 1.1 in each case forms a support in the form of a side bolster for the backrest 2.

Figure 4:
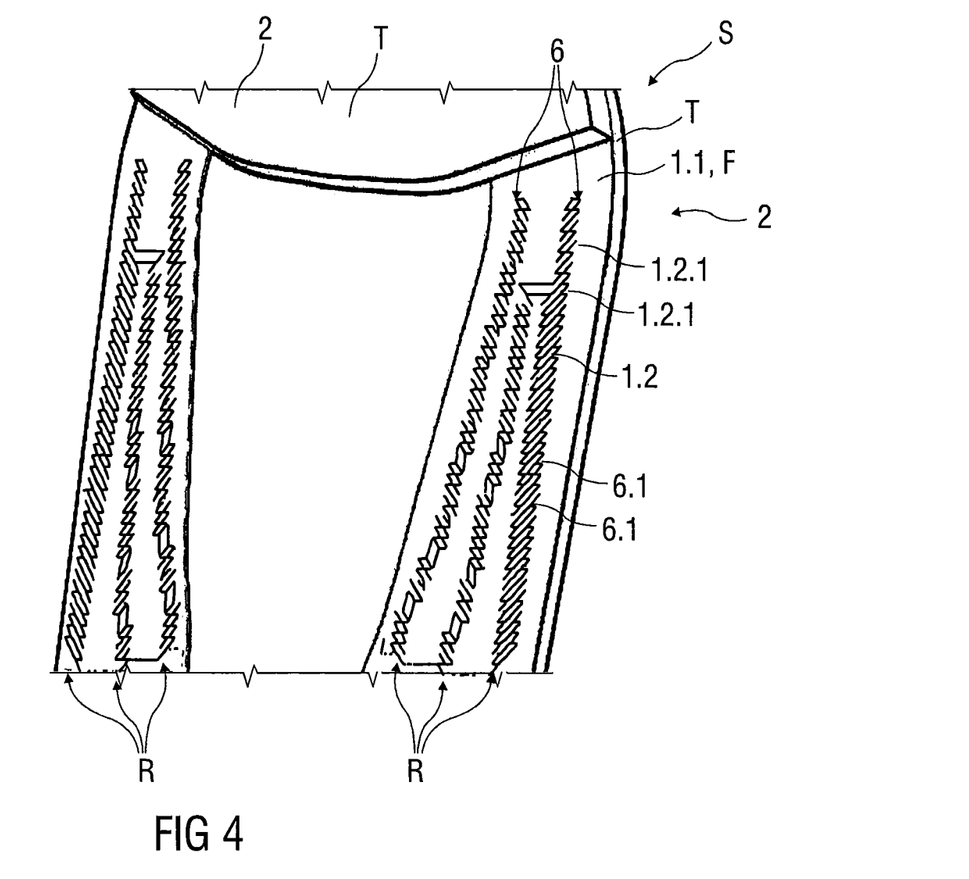

FIG. 4 shows an enlarged illustration of the partially and group-by-group expanded adjusting elements 1.2.1 of the backrest 2 of the seat S according to FIG. 3 from the front with two laterally arranged part structures 1.1 with a plurality of rows R of adjusting elements 1.2.1.

Figure 5:
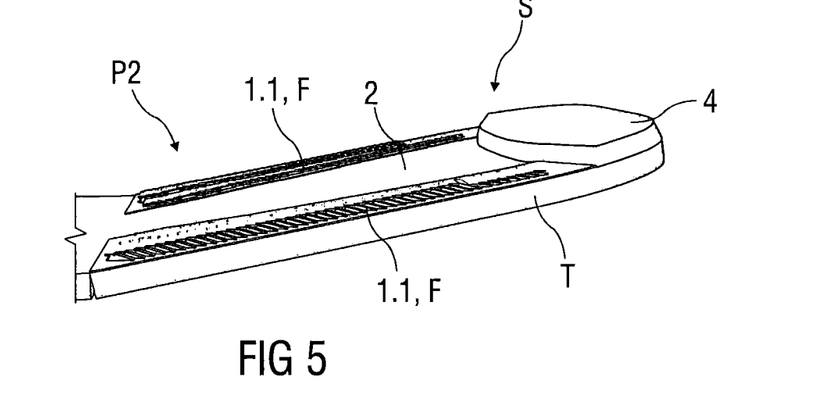
Figure 6:
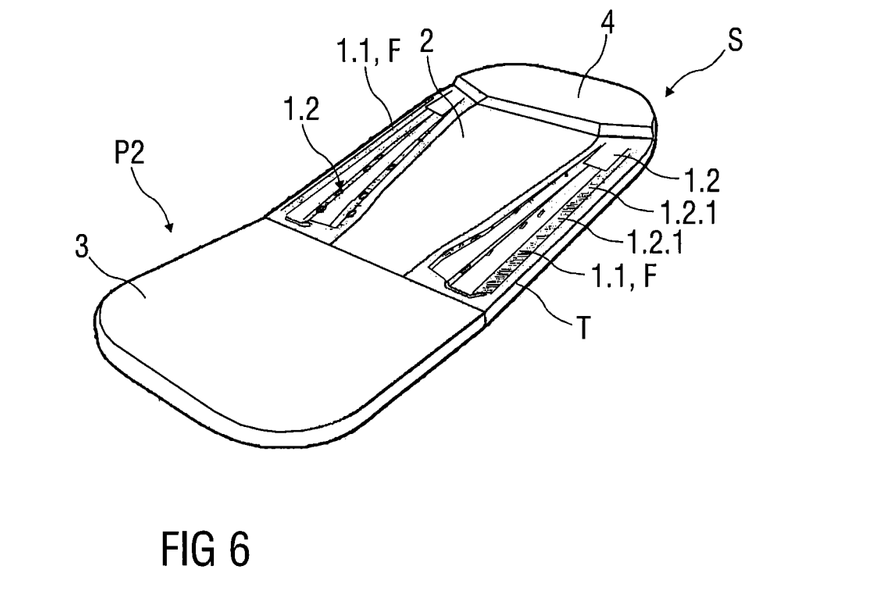

FIGS. 5 and 6 show the backrest 2 of the seat S according to FIG. 3 in a perspective illustration with the two laterally arranged part structures 1.1, the seat S being set in the bed position P2 and the adjusting elements 1.2.1 being set in different state positions, in particular being moved into the compressed position, in order to form a planar surface and contour K.

FIGS. 7 to 15 diagrammatically show different illustrations of a structural component 1 with the adjusting mechanism 1.2 for setting different contours K, in particular arcuate, curved and/or linear, in particular planar or flat contours K.

Figure 7:
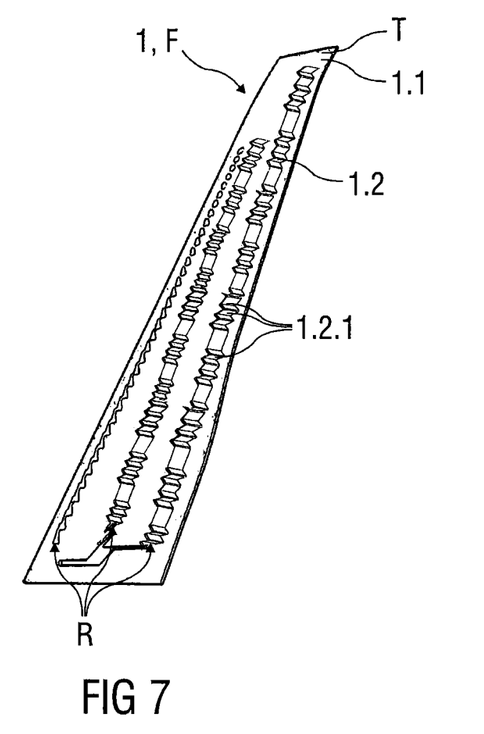
Figure 8:
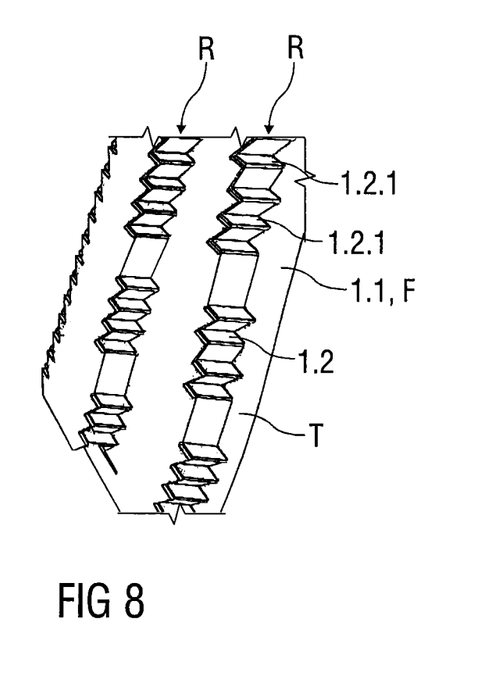

FIGS. 7 and 8 in each case show a perspective and an enlarged perspective view of a side bolster region of the backrest 2 with differently arranged adjusting elements 1.2.1 in a plurality of rows R of the associated part structure 1.1. Here, some adjusting elements 1.2.1 are partially or completely expanded, and other adjusting elements 1.2.1 are partially or completely compressed.

Figure 9:
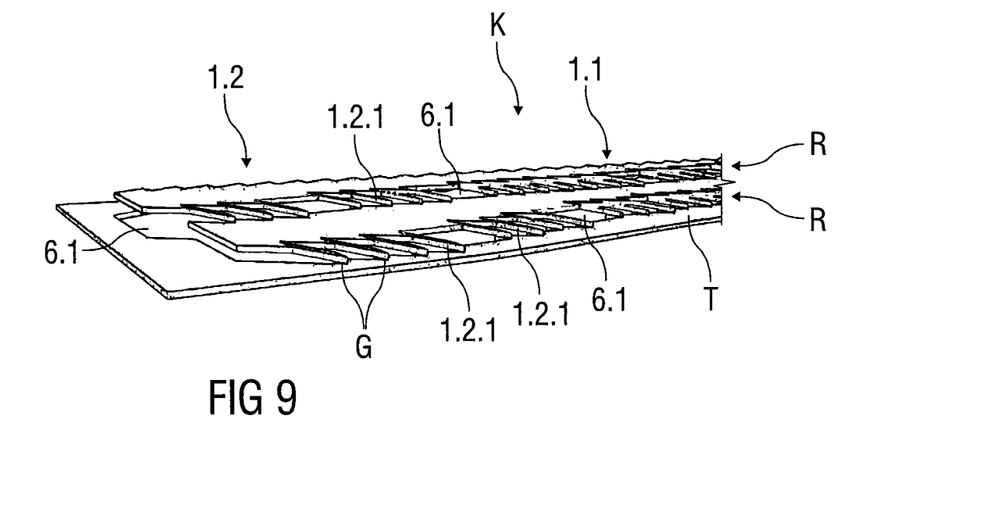
Figure 10:
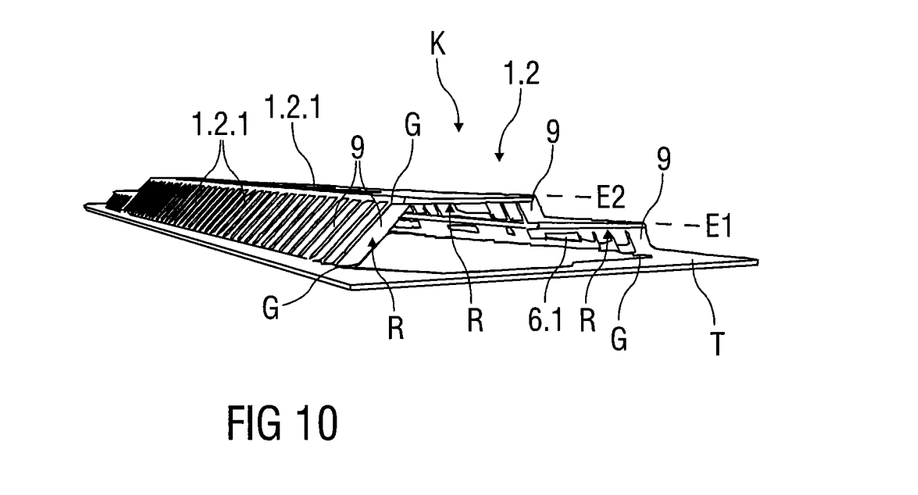

In FIGS. 9 and 10, the adjusting elements 1.2.1 can be arranged in planes E1, E2 of different height and/or offset with respect to one another, and can additionally be connected to one another in an articulated manner in each case by a lever 9. The static requirement of the surface can be adapted individually by the number of levers 9 and their geometry. The levers 9 are correspondingly articulated by joints G, in particular solid body joints, such as integral hinges or strap hinges. Using this principle, it is possible to deform the panel element F from a flat plate with a planar contour (FIG. 9, for example for a lying position of the seat S) into a three-dimensional surface with a three-dimensional contour K (FIG. 10, for lateral support), and vice versa.

Figure 11:
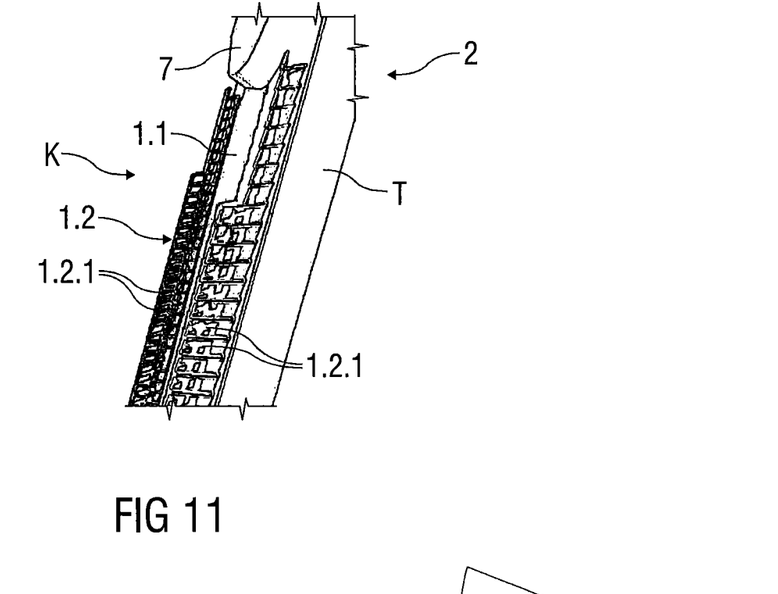
Figure 12:
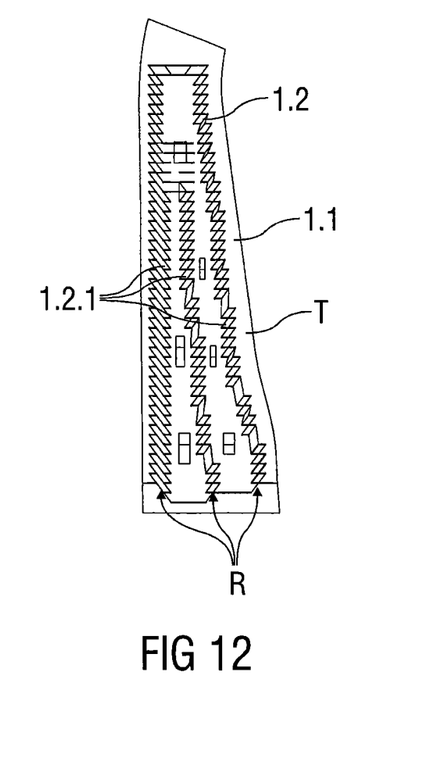

FIGS. 11 and 12 show a side view and top view, respectively, of a side bolster region of the backrest 2 with deployed adjusting elements 1.2.1 in a plurality of rows R of a part structure 1.1.

Figure 13:
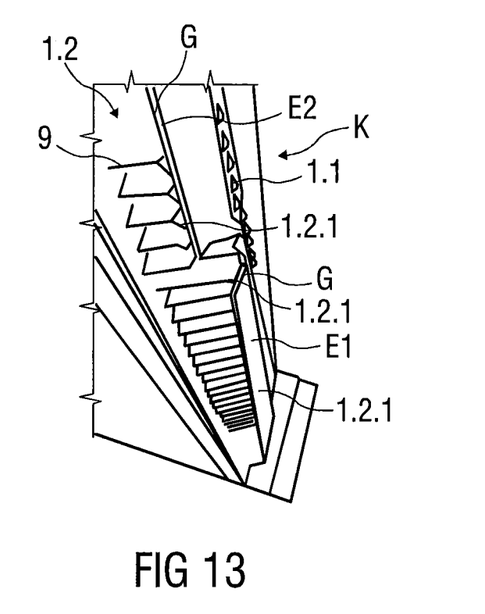
Figure 14:
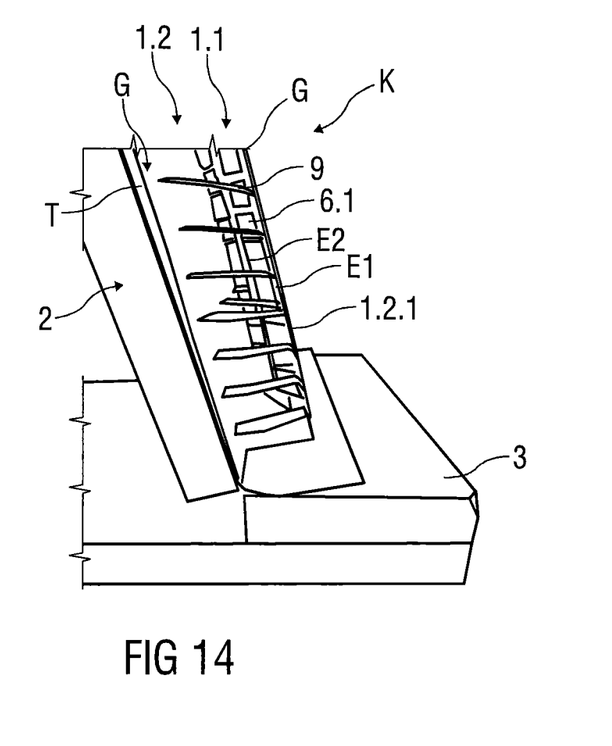

FIGS. 13 and 14 show enlarged illustrations of the side bolster region of the backrest 2 with deployed adjusting elements 1.2.1 for forming a three-dimensional contour K, in particular a support contour.

Figure 15:
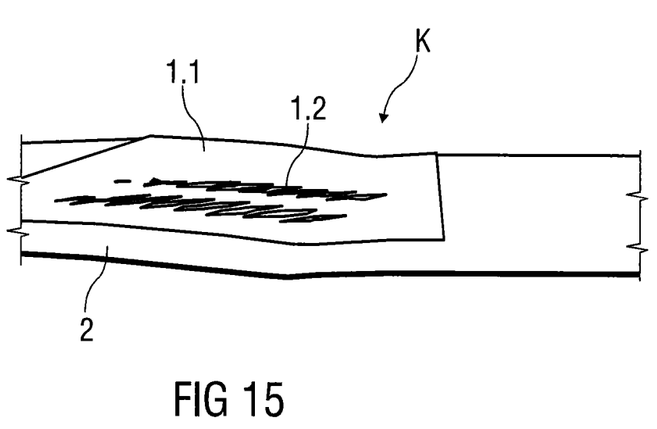

FIG. 15 shows the backrest 2 in a flat position, in particular a lying or bed position, with compressed adjusting elements 1.2.1 for forming a planar and flat contour K.

LIST OF DESIGNATIONS

1 Structural component
1.1 Part structure
1.2 Adjusting mechanism
1.2.1 Adjusting element
2 Backrest
3 Seat part
4 Head support
5 Upholstery part
6 Grid
6.1 Slots
7 Control unit
8 Drive element
9 Lever
E1 to Ek Plane
F Panel element
G Joint
G1 to Gn Group of adjusting elements
HD Horizontal rotational axis
K Contour
KP Inflection point
L Slat
P1, P2 Position
R Row
S Seat
T Supporting structure
VD Vertical rotational axis
VS1 to VSn Adjusting stages

The invention claimed is:

1. A structural component for a vehicle seat, comprising:
a supporting structure, and
a part structure which is arranged on the supporting structure wherein the part structure has an initial flat compressed condition and a variable contour expanded condition where the part structure has an adjusting mechanism with a plurality of adjusting elements, and the adjusting mechanism is adapted to adjust the adjusting elements between an initial flat compressed position and a variable contour expanded position to change the contour of the part structure, wherein the part structure is of a monolithic construction, wherein a pattern comprised of slots and inflection points is made in the part structure to form slats or wings between the slots.

2. The structural component as claimed in claim 1, wherein the adjusting mechanism is coupled in terms of movement to the supporting structure, in order, in the case of a movement of the supporting structure, to adjust the adjusting elements between the initial flat compressed position and the variable contour expanded position and to change the contour of the part structure.

3. The structural component as claimed in claim 1, further comprising a drive element coupled in terms of movement to the adjusting mechanism in order to adjust the adjusting elements between the initial flat compressed position and the variable contour expanded position and to change the contour of the part structure.

4. The structural component as claimed in claim 3, wherein the drive element is an electric actuating element, a hydraulic actuating element or a pneumatic actuating element.

5. The structural component as claimed in claim 1, wherein the adjusting mechanism is configured as an adjustable folding mechanism.

6. The structural component as claimed in claim 1, wherein the respective adjusting element is moved during the expansion, in such a way that the part structure is given an arcuate or curved contour in the expanded position.

7. The structural component as claimed in claim 1, wherein the respective adjusting element is moved during the compression, in such a way that the part structure has a smaller height in the compressed position than in the expanded position, and/or has a planar contour.

8. The structural component as claimed in claim 2, wherein the part structure is formed from at least one panel element with a plurality of repeating adjusting elements which are arranged in at least one row.

9. The structural component as claimed in claim 2, wherein the part structure is formed from at least one panel element formed from multiple rows of adjusting elements.

10. The structural component as claimed in claim 9, wherein the part structure is coupled in terms of movement to the supporting structure in such a way that the part structure changes its contour and/or its volume in a manner which is dependent on a controlled force which acts on the supporting structure.

11. A seat component, including a backrest or a seat part, the seat component comprising at least:
one seat carrier,
one upholstery part and/or one cover, and
one structural component as claimed in claim 1.

12. The seat component as claimed in claim 11, the part structure forming at least one part region of the upholstery part and/or the cover.

13. A seat, comprising at least two seat components as claimed in claim 11, which can be moved with respect to one another and of which at least one movable seat component comprises the structure component, wherein the adjusting mechanism is moved into an expanded or into a compressed position in the case of a movement of the movable seat component relative to the other seat component.

* * * * *